United States Patent
Masuda et al.

(10) Patent No.: US 7,729,221 B2
(45) Date of Patent: Jun. 1, 2010

(54) OPTICAL DISK DISCRIMINATION METHOD AND OPTICAL DISK DEVICE

(75) Inventors: Tsukasa Masuda, Kumamoto (JP); Hiroshi Tsuji, Fukuoka (JP); Yoshiro Kashiwabara, Fukuoka (JP); Shingo Sagata, Kumamoto (JP)

(73) Assignee: Panasonic Corporation, Osaka (JP)

( * ) Notice: Subject to any disclaimer, the term of this patent is extended or adjusted under 35 U.S.C. 154(b) by 494 days.

(21) Appl. No.: 11/740,025

(22) Filed: Apr. 25, 2007

(65) Prior Publication Data

US 2007/0171782 A1     Jul. 26, 2007

(30) Foreign Application Priority Data

Apr. 26, 2006   (JP)   ............................... 2006-121476

(51) Int. Cl.
    G11B 7/00     (2006.01)
(52) U.S. Cl. ............... 369/53.23; 369/44.25; 369/44.27
(58) Field of Classification Search ................ 369/53.2, 369/53.21, 44.27, 44.25, 53.22, 53.23
    See application file for complete search history.

(56) References Cited

FOREIGN PATENT DOCUMENTS

| JP | 2005085351 | | 3/2005 |
|---|---|---|---|
| JP | 2005183001 A | * | 7/2005 |

\* cited by examiner

Primary Examiner—Thang V Tran
(74) Attorney, Agent, or Firm—Dickinson Wright PLLC

(57) ABSTRACT

The invention provides an optical disk device that has a laser unit including a first objective lens and a second objective lens. A numerical aperture of the first objective lens is different from a numerical aperture of the second objective lens. The optical disk device has a first focus driver that detects a first voltage value indicating the value of a driving voltage to drive the first objective lens when light beams are irradiated onto the surface of an optical disk via the first objective lens and a focus is achieved. The optical disk device has a second focus driver that detects a second voltage value indicating the value of a driving voltage to drive the second objective lens when light beams are irradiated onto the recording surface of said optical disk via the second objective lens and a focus is achieved. The optical disk device has a controller that discriminates the type of an optical disk, based on a difference between the first voltage value and the second voltage value.

12 Claims, 12 Drawing Sheets

(b)

(a)

OPTICAL DISK DISCRIMINATION METHOD AND OPTICAL DISK DEVICE

BACKGROUND

1. Field of the Invention

The present invention relates to an optical disk discrimination method for recording/reproducing information to/from multiple types of optical disks by using an optical pickup and an optical disc device using the method.

2. Description of the related art

In recent years, optical disks as disc-shaped recording media have been in general use as an external storage device of a personal computer. Such optical disks are available in a variety of types including a CD initially developed for the purpose of appreciation of music, a CD-R, a CD-RW, a DVD-ROM, a DVD-R, a DVD±RW, a DVD-RAM, and a Blu-ray Disc (hereinafter also referred to as a BD) developed for recording of data on personal computers. An optical disk device that supports these optical disks is designed so that multiple optical disks can be used on a single optical disk device. This means that an optical disk must have a feature to detect the type of an optical disk mounted on the optical disk.

With these optical disks, the emission wavelength of laser beams used for recording/reproducing data differs between a CD system a DVD system and a BD system. The corresponding optical system differs according. It is thus important to discriminate the type of an optical disk mounted on an optical disk device.

A related art optical disk device that supports both the CD system and the DVD system will be described referring to FIG. 9.

FIG. 9 is a block diagram of the pickup controller of an optical disk device. In FIG. 9, a numeral 1 represents an optical disk, 2 a pickup module, 3 a spindle motor, 4 an optical pickup, 5 a carriage, 6 a feed part, 7 a feed motor, 8 an analog signal processor, 9 a servo processor, 10 a motor driving part, 11 a digital signal processor, 12 a laser driving part, and 13 a controller.

Operation of a pickup controller thus configured in the related art will be described.

In FIG. 9, the pickup module 2 is composed of the spindle motor 3 for rotating the optical disk 1, the optical pickup 4 for reading an information signal from the optical disk 1, and the feed part 6 for moving in the radial direction of the optical disk 1 the carriage 5 where the optical pickup 4 is mounted. The analog signal processor 8 generates a focus error signal and a tracking error signal based on signal output from an optical sensor (not shown) inside the optical pickup 4 in the carriage 5 provided inside the pickup module 2 and outputs the signals to the servo processor 9.

The focus error signal indicates a displacement of a light beam spot emitted from an objective lens (not shown) included in the optical pickup 4 from the recording surface of the optical disk 1 in the focal direction. The tracking error signal indicates a displacement of the optical spot from the information track of the optical disk 1 in the radial direction of the optical disk.

The analog signal processor 8 generates a lens position signal indicating the relative positions of the objective lens and the carriage 5 by extracting the low range components of a tracking error signal.

The servo processor 9 is composed of an ON/OFF circuit, an arithmetic circuit, a filter circuit and an amplifier circuit. The servo processor 9 performs focus/tracking control over the objective lens so that the light beam spot will trace the information track of the optical disk, and performs feed control so that the objective lens will maintain an almost neutral position by using the low range components of the tracking error signal. The feed part 6 is composed of a feed motor 7, a gear (not shown), and a screw shaft (not shown). When the feed part 6 rotates the feed motor 7, the carriage 5 moves as a feed motor pulse is periodically outputted from the feed motor 7. The controller 13 controls the entirety of thus configured servo part.

FIG. 10 is a block diagram of the focus control system of a related art optical disk device.

In FIG. 10, a numeral 14 represents an objective lens, 15 a half mirror, 16 a division sensor, 17 a head amplifier, 18 a differential amplifier, 19 a division sensor, 20 a head amplifier, 21 a differential amplifier, 22 a selector switch, 23 a filter, 24 a selector switch, and 25 a driving circuit.

Operation of a focus control system of an optical disk device thus configured will be described. To discriminate the type of an optical disk, generally laser beams having a longer wavelength for CDs are irradiated first and laser beams having a shorter wavelength for DVDs are irradiated next in consideration of the difference in the optical power level.

When laser beams for CDs are irradiated, light reflected on the reflecting surface of the optical disk 1 in FIG. 10 reaches the half mirror 15 via the objective lens 14. For example, light for CDs passes through the half mirror 15 and impinges on the division sensor 16 and gain-adjusted by the head amplifier 17. Differential arithmetic operation is made by the differential amplifier 18 on a signal from the head amplifier 17 to generate a focus error signal related to laser beams for CDs are used.

The focus error signal thus generated that is related to laser beams for CDs are used as a signal to pass through the selector switch 22 and control a focus actuator via the filter 23, selector switch 24, and driving circuit 25.

The focus error signal is transmitted to the controller 13 for the controller 13 to control focus driving.

Next, an exemplary method for discriminating the type of an optical disk mounted will be described.

FIG. 11 is an explanatory drawing to discriminate the type of an optical disk.

As shown in FIG. 11, the objective lens is brought closer to a recording surface from a distance to the optical disk. A focus error signal (FE signal) is detected and the detected s-curve characteristic and added value FS of the FE signal are obtained. The CD system or DVD system is determined as follows: when the normalized FE amplitude value shown in FIG. 11 is greater than a threshold, a CD disk is assumed; when the value is smaller than a threshold, a DVD disk is assumed.

FIG. 12 shows normalized FE amplitude values by optical disk type and optical disk device.

As shown in FIG. 12, it is possible to set a threshold for a normalized FE amplitude value and use the threshold to discriminate between optical CD disks and optical DVD disks. When the detected normalized FE amplitude value is greater than the threshold, a CD disc is assumed. When the value is smaller, a DVD disk is assumed.

A technique to discriminate the type of an optical disk is described on Patent Reference 1.

Patent Reference 1: JP-A-2005-85351

However, there are some cases where a CD disk and a DVD disk cannot discerned using a threshold specified based on a normalized FE amplitude value due to variations in the assembly of optical components of optical disk devices or variations in the manufacture of optical disks.

FIG. 13 represents normalized FE amplitude values corresponding to several types of optical disks.

Part A in FIG. 13 corresponds to an optical disk device that determines a DVD disk as a CD disk because the s-curve amplitude value of the focus error of DVD is large. Part B in FIG. 13 corresponds to an optical disk device that determines a CD disk as a DVD disk because the s-curve amplitude value of CD is small.

In this way, each of the optical disk devices is accompanied by variations in the manufacture of optical components and amplitude of s-curve characteristic of a focus error signal. This results in failure to discriminate between CD disks and DVD disks.

SUMMARY

An object of the invention is to provide an optical disk discrimination method capable of reliably discriminating the type of an optical disk even in the presence of variations in the s-curve characteristic of a focus error signal attributable to variations in the assembly of optical components and an optical disk device using the method.

In order to solve such problems, the invention provides an optical disk device that has a laser unit including a first objective lens and a second objective lens. A numerical aperture of the first objective lens is different from a numerical aperture of the second objective lens. The optical disk device has a first focus driver that detects a first voltage value indicating the value of a driving voltage to drive the first objective lens when light beams are irradiated onto the surface of an optical disk via the first objective lens and a focus is achieved. The optical disk device has a second focus driver that detects a second voltage value indicating the value of a driving voltage to drive the second objective lens when light beams are irradiated onto the recording surface of said optical disk via the second objective lens and a focus is achieved. The optical disk device has a controller that discriminates the type of an optical disk, based on a difference between the first voltage value and the second voltage value.

With this configuration, a laser unit with the greatest numerical aperture may be used to obtain the surface position of an optical disk. This accurately obtains the surface position because the target spot is focused on. The position of a recording surface is obtained by using a laser unit with the greatest substrate thickness of an optical disk. This avoids a contact of the laser unit with the substrate of the optical disk. As a result, the optical disk device can discriminate the type of an optical disk based on a difference in the voltage value obtained when the focuses are on the position of the surface and the recording surface of the optical disk.

The optical disk device according to the invention is capable of reliably discriminate the type of an optical disk even in the presence of variations in the manufacture of optical disks.

DETAILED DESCRIPTION

Embodiments of the invention will be described referring to drawings.

Figure 1:
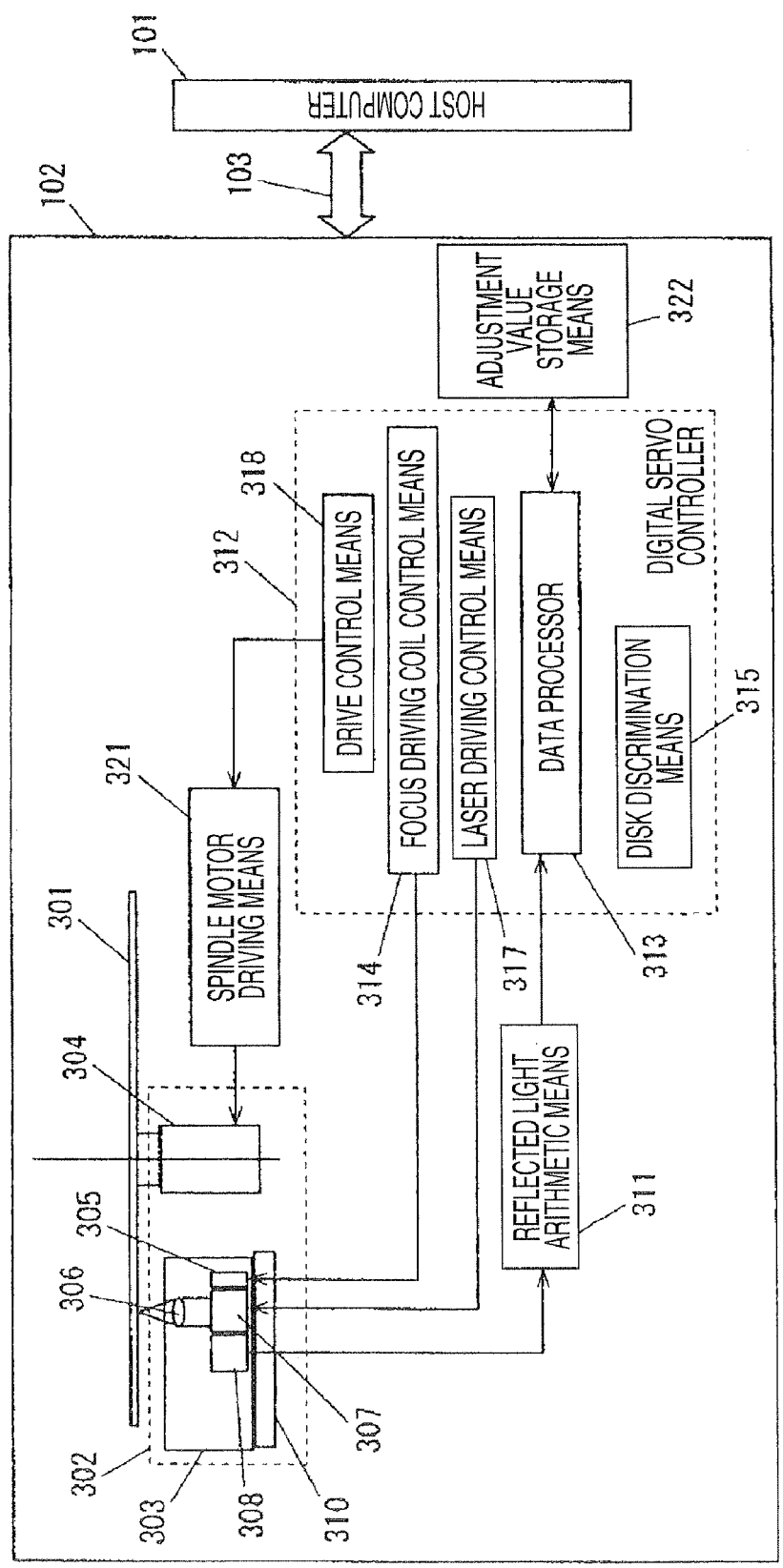
FIG. 1 is a block diagram of an optical disk device according to an embodiment of the invention.

FIG. 1 is a block diagram of an optical disk device according to an embodiment of the invention.

In FIG. 1, a numeral 101 represents a host computer as an external terminal device, 102 an optical disk device, 103 an interface, 301 an optical disk, 302 an optical pickup module, 303 an optical pickup, 304 a spindle motor, 305 a focus driving coil, 306 an objective lens, 307 a laser, 308 reflected light receiving means, 310 a carriage, 311 reflected light arithmetic means, 312 a digital servo controller, 313 a data processor, 314 focus driving coil control means, 315 disk discrimination means, 317 laser driving control means, 318 drive control means, 321 spindle motor driving means, and 322 adjustment value storage means.

An optical disk device 102 thus configured according to an embodiment of the invention will be described.

The host computer 101 and an optical disk device 102 transmits/receives information via the interface 103. A request made to the optical disk 301 from the host computer 101 concerning the operation of the optical disk device 102 is transmitted to the optical disk device 102 via the interface 103. This request is issued in a packet command of the interface from the host computer 101. The optical disk device 102 receives this command on command receiving means 323 and operates un response to this command.

The optical pickup module 302 is composed of a spindle motor 304 for rotating the optical disk 301 that performs at least recording or reproduction of information, the optical pickup 303 for performing at least recording or reproduction of information onto/from the optical disk 301 by using the light emission pattern of the laser 307, and a feed part (not shown) for moving the carriage 310 where the optical pickup 303 is mounted in the radial direction of the optical disk 301.

The drive control means 318 controls the spindle motor driving means 321 to adjust the number of rotations of the spindle motor 304.

The optical pickup 303 includes the focus driving coil 305 for making control to bring the objective lens 306 of the optical pickup 303 closer to or away from the optical disk 301 by way of the focus driving coil control means 314. The optical pickup 303 thus adjusts the objective lens 306 so as to focus on a predetermined position of the optical disk 301.

The reflected light receiving means 308 receives reflected light from the optical disk 301 and outputs a signal based on the received reflected light.

From the outputted signal, a focus error signal (FE signal) or a tracking error signal (TE signal) are generated by the reflected light arithmetic means 311, followed by processing of a focus error or a tracking error in the data processor 313 in the digital servo controller 312.

The data processor 313 also includes a feature to discriminate the type of the optical disk 301 based on a focus error signal.

The adjustment value storage means 322 is storage means provided to adjust the variations in the optical system during manufacture of the optical disk device 102 and stores an adjustment value to normalize a focus driving value described later.

The laser driving control means 317 selects a predetermined laser light source among a plurality of lasers such as a Blu-ray (BD) laser, a DVD laser and a CD laser before recording or reproducing information onto/from the optical disk 301 and performs driving control over the laser power of the laser 307.

Figure 2:
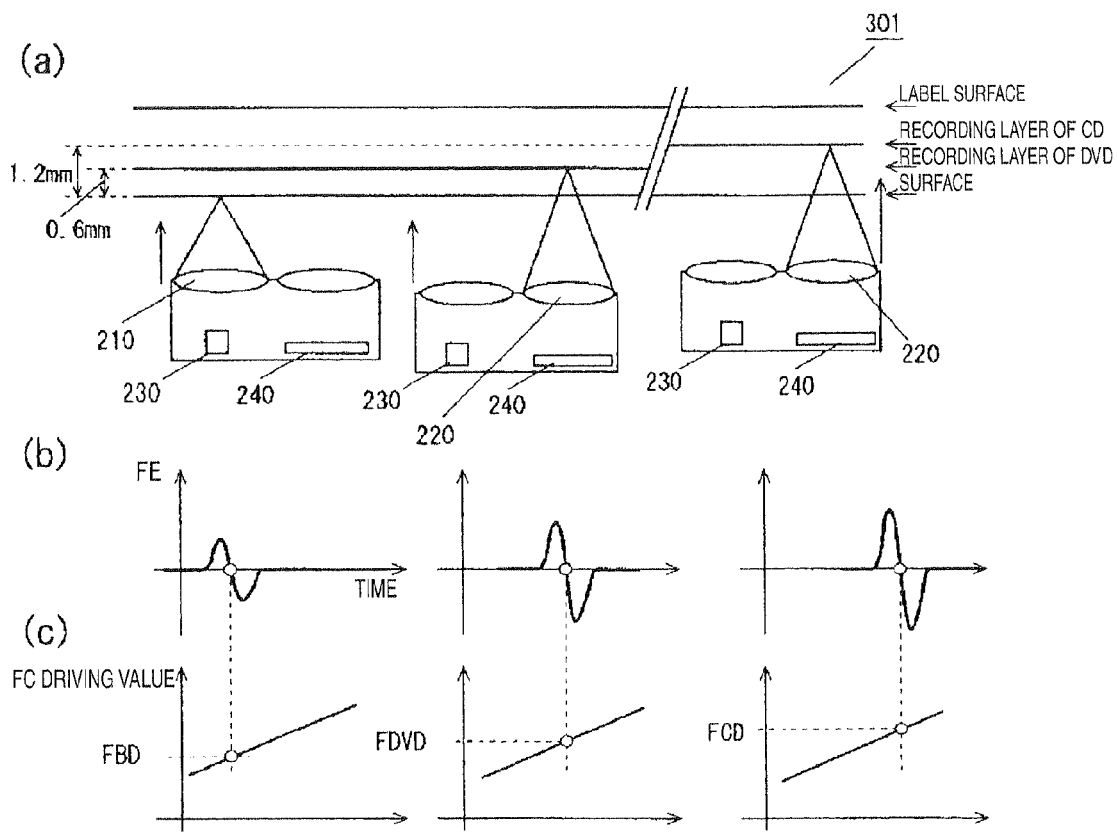
FIG. 2 illustrates a focus error according to an embodiment of the invention.
Figure 3:
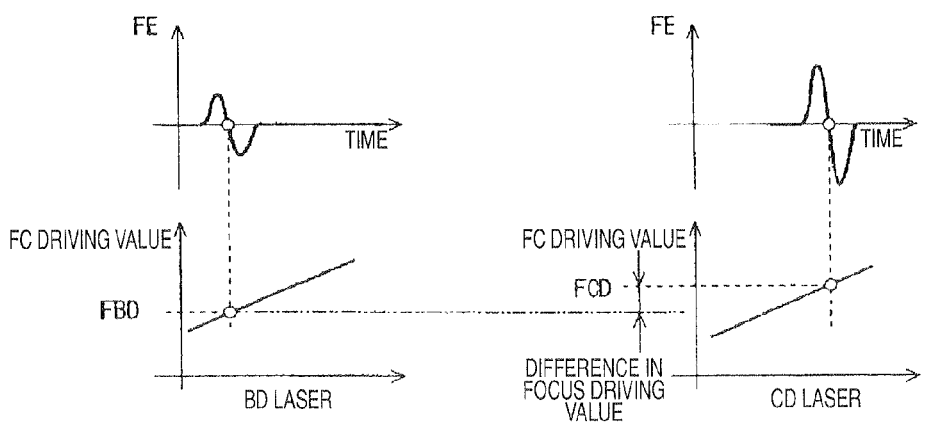
FIG. 3 illustrates a difference in focus driving values according to an embodiment of the invention.
Figure 4:
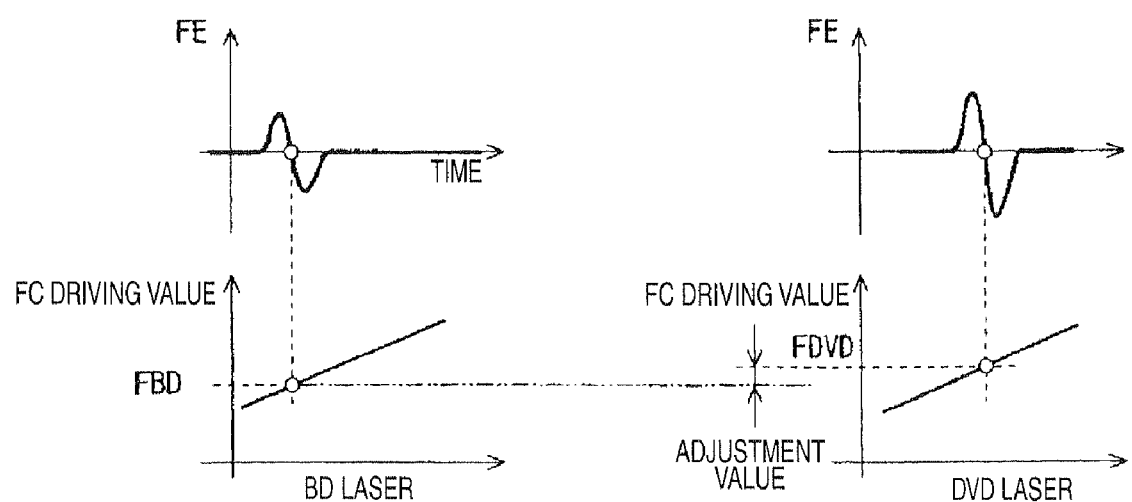
FIG. 4 illustrates the calculation of an adjustment value according to an embodiment of the invention.

FIG. 2 illustrates a focus error according to an embodiment of the invention. FIG. 3 illustrates a difference in focus driving values according to an embodiment of the invention. FIG. 4 illustrates the calculation of an adjustment value according to an embodiment of the invention.

Referring to FIG. 2, a numeral 301 represents an optical disk, 210 an objective lens for BDs, 220 an objective lens for CDs and DVDs (generally represented by 301 in FIG. 1), 230 a BD laser light source, and 240 a double-wavelength laser light source for CDs and DVDs. Light sources of three wavelengths are thus provided.

Included are the objective lens 210 for gathering light beams for a BD laser light source and the he objective lens 220 for CDs and DVDs. The numerical aperture of the objective lens 210 is greater than 0.8 and the numerical aperture of the objective lens 220 for CDs and DVDs is selected within a range of 0.5 to 0.7.

A method will be described for discriminating the type of the optical disk 301 by way of substrate thickness discrimination, in particular between a CD and a DVD, based on FIGS. 2, 3 and 4.

In the process of substrate thickness discrimination, a laser 230 for BDs, a laser for DVDs and a laser 240 for CDs are turned on in this order with a spindle motor 304 turned OFF. Each time a laser is turned on, the corresponding objective lens is oriented in the focus direction to perform focus-related measurement. A difference in the substrate thickness is detected based on then obtained FE signal amplitude, FE signal symmetry, number of s-shaped waveforms of an FE signal, and focus driving value (focus-achieved voltage value) to discriminate between a BD, a DVD and a CD.

While the spindle motor is kept OFF in this embodiment, the spindle motor 304 may be turned ON when it is desired to save the operation time. Or, the spindle motor 304 may be turned OFF only when the BD laser is driven to perform focus measurement. In this way, it is possible to prevent the objective lens 210 for BDs from coming into contact with the optical disk 301.

When a voltage is supplied to the focus driving coil 305 to bring the objective lenses 210, 220 closer to the optical disk 301 from a distance to the same, a focus error value (FE value) is measured. In the measurement result, the FE values are represented in an s-curve as shown in FIG. 2(b). The zero-crossing points of the s-curve, FBD, FDVD and FCD are called the focus driving value of respective lasers.

Calculation of a difference in the focus driving error will be described based on FIG. 3. A drive value FBD for the surface of the optical disk 301 is obtained in calculating an FE value by driving the BD laser. The CD laser is driven to obtain the focus driving value FBD of s-curve detection for the recording surface of the disk, and then a difference in the focus driving value is calculated.

Difference in focus driving value=FCD−FBD

Next, an adjustment value mentioned later is obtained from the adjustment value storage means 22 and the adjustment value is used to normalize the difference in the focus driving value.

Normalized difference in focus driving value=Difference in focus driving value/adjustment value×1000

As described later, the BD substrate thickness is determined first in the determination of substrate thickness with the BD laser. A focus driving value for the surface of the disk 301 can be obtained in this BD determination.

A method for obtaining an adjustment value will be described in accordance with FIG. 4.

An adjustment value is a value set for each optical disk device 102. The value is set in consideration of the influence of variations in the s-curve amplitude value of FE value due to variations in the optical axis of an optical system and may be used to discriminate the real optical disk 301.

As shown in FIG. 4, before the optical disk device 102 is used, the laser 230 for BDs is used to obtain the focus driving value FBD for the surface of the optical disk 301 and the focus driving value FDVD for the recording surface by the DVD laser 240. The difference between these values is stored as an adjustment value into the adjustment value storage means 322.

An adjustment value stored into the adjustment value storage means 322 is called when the optical disk 301 is mounted on the optical disk device 102 and is used to discriminate the type of the optical disk 301. The adjustment value need not be calculated again once it is previously stored when the optical disk device 102 is manufactured.

Figure 5:
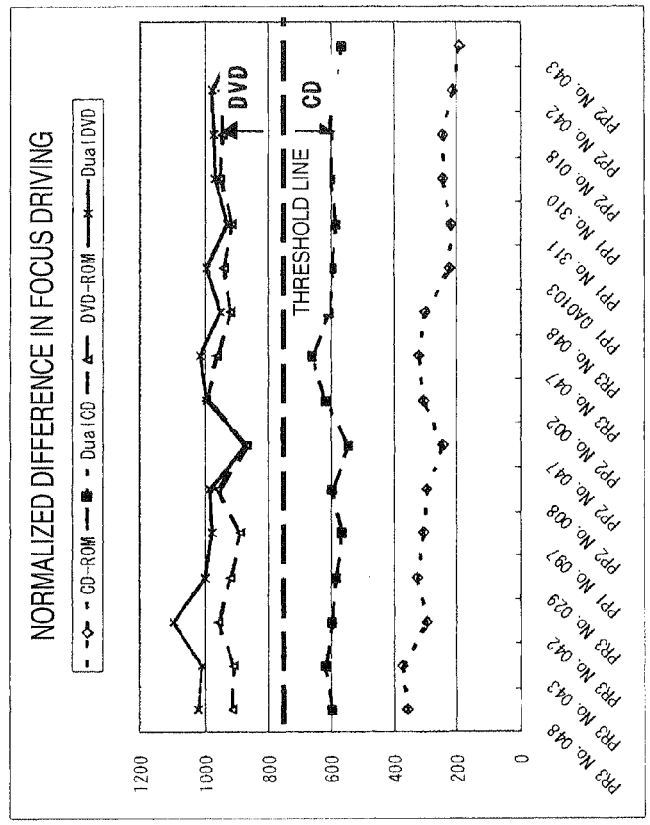
FIG. 5 shows an example of a normalized optical disk discrimination process that is based on the difference in focus driving according to an embodiment of the invention.
Figure 5:
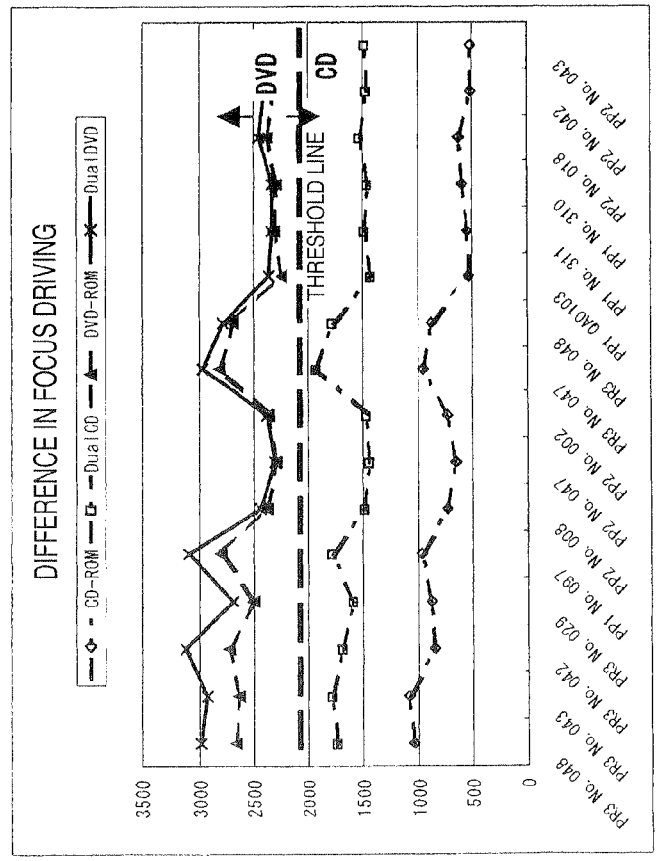

FIG. 5 shows an example of an optical disk discrimination process that is based on the difference in focus driving according to an embodiment of the invention.

FIG. 5(a) shows a difference in focus driving for each optical disk device. FIG. 5(b) shows a normalized difference in focus driving for each optical disk device.

By setting a threshold line to about 2100 based on the difference in focus driving shown in FIG. 5(a), it is possible to classify the types of an optical disk into a DVD and a CD. When the normalized difference in focus driving shown in FIG. 5(b) is used for discrimination t is possible to classify the types of an optical disk into a DVD and a CD by setting the threshold line to about 720.

In other word, a result greater than a preset threshold assumes a DVD and one smaller than a preset threshold assumed a CD irrespective of whether a difference in focus driving or a normalized difference in focus driving is used in discrimination of a disk.

As shown in FIG. 5(a) and FIG. 5(b), discrimination using a normalized difference in focus driving is an easier approach to discriminate between a CD and a DVD.

Figure 6:
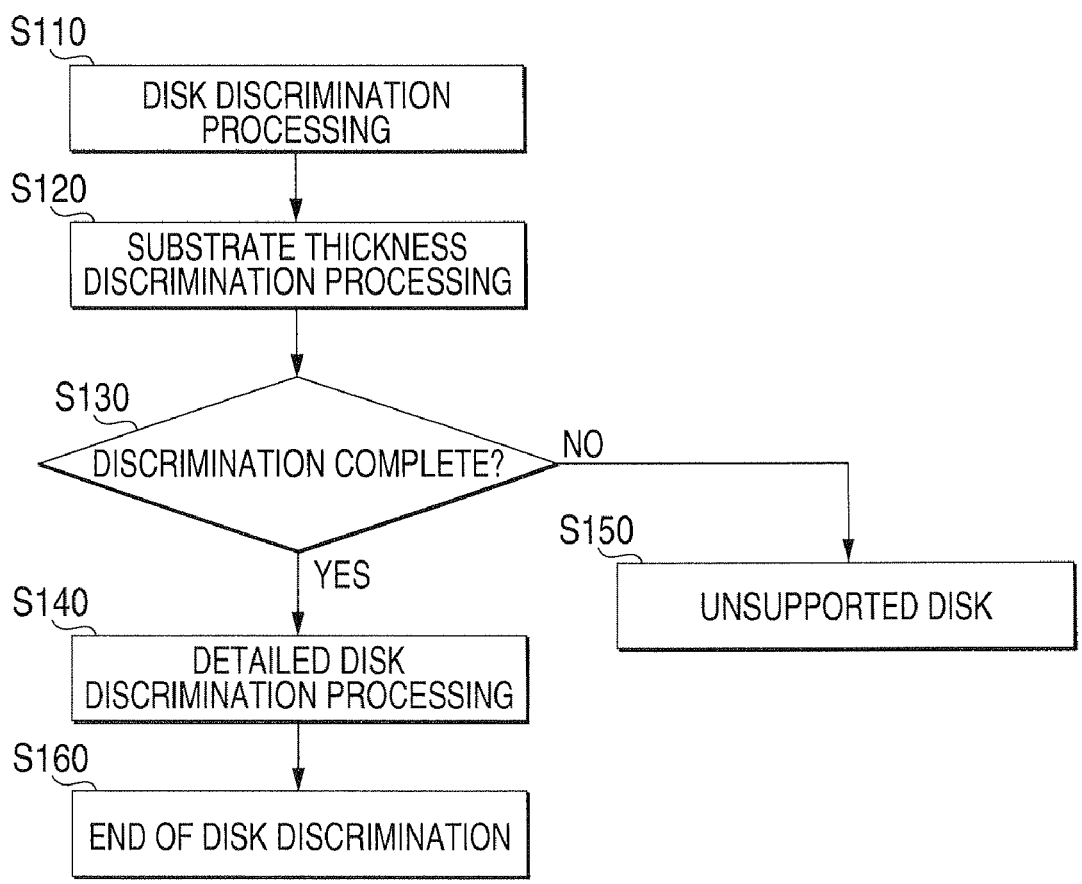
FIG. 6 is a flowchart of disk discrimination processing according to an embodiment of the invention.

FIG. 6 is a flowchart of disk discrimination processing according to an embodiment of the invention. When discrimination processing of the optical disk 301 starts (S110), substrate thickness discrimination processing is executed (S120) and it is determined whether the disk is discriminated through substrate thickness discrimination processing (S130). In case the disk is not discriminated, the disk is determined unsupported (S150) and the processing is terminated.

When the disk is discriminated through substrate thickness discrimination processing (S130), detailed disk discrimination processing is executed (S140) and the optical disk discrimination processing is terminated (S160).

Figure 7:
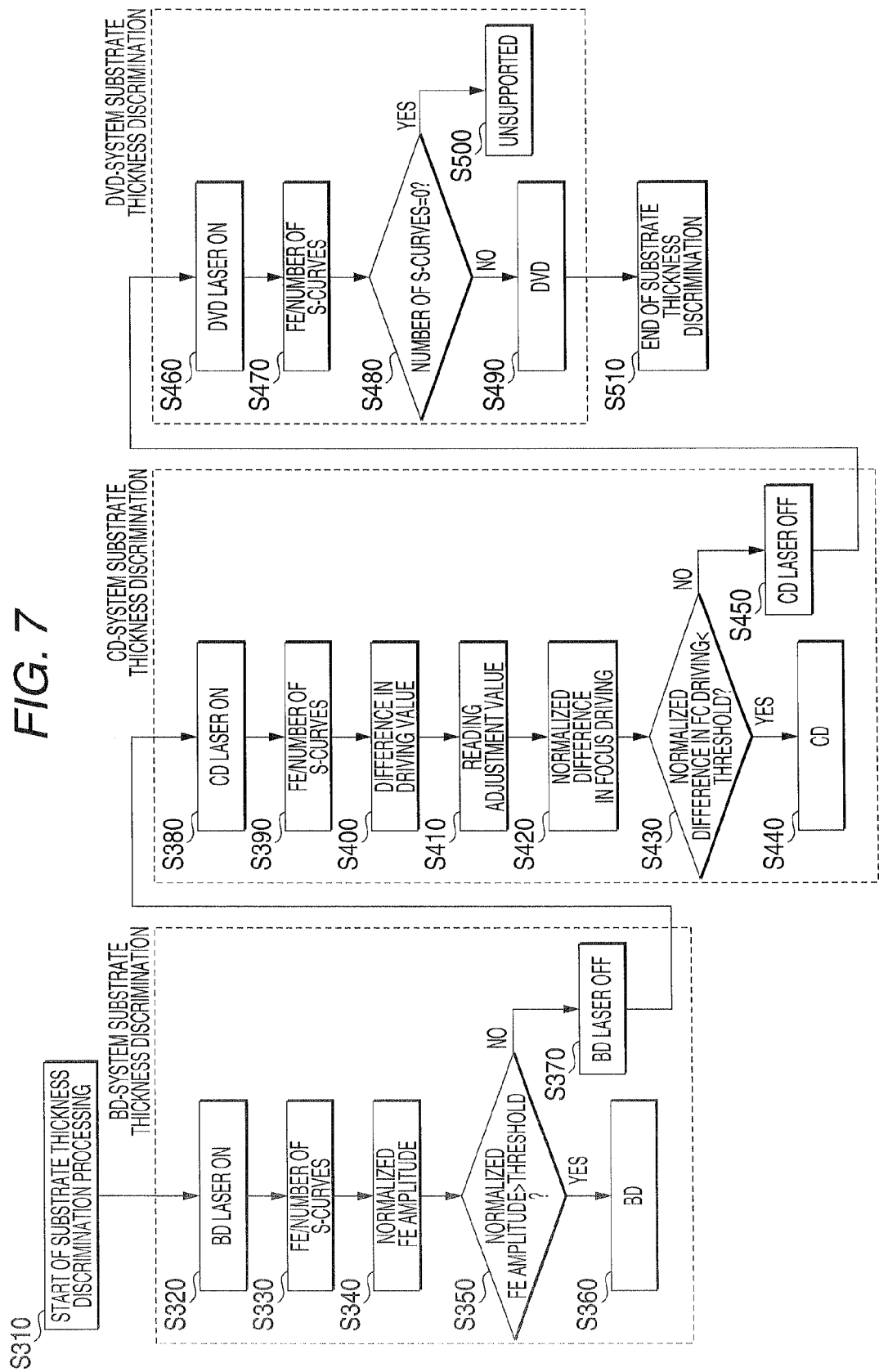
FIG. 7 is a flowchart of substrate thickness discrimination processing according to an embodiment of the invention.

FIG. 7 is a flowchart of substrate thickness discrimination processing according to an embodiment of the invention.

In FIG. 7, when the substrate thickness discrimination processing starts (S310), the BD laser is turned on to perform BD system substrate thickness discrimination processing (S320). The BD laser is used to detect the focus error value (FE value) and the number of s-curves (S330) of the optical disk 301. A normalized FE amplitude value is obtained (S340) and it is determined whether the normalized FE amplitude value obtained is greater than a threshold (S350). In case the obtained value is greater than the threshold, the disk is determined as a BD disk (S360). In case the obtained value is equal to or smaller than the threshold, the BD laser is turned off (S370) and the CD laser is turned on (S380). The CD laser is used to detect the FE value and the number of s-curves (S390). A difference between the focus driving value of BD (drive value for the surface of an optical disk) and the focus driving value of the CD laser is obtained (S400). An adjustment value specific to the optical disk device 1 is read from a storage device (S410). A normalized difference in focus driving is calculated from the obtained difference in focus driving and the read adjustment value (S420). It is determined whether the normalized difference in focus driving is smaller than the threshold (S430). In case the normalized difference in focus driving is smaller than the threshold, the disk is determined as a CD (S440). Otherwise, the CD laser is turned off (S450) and the DVD laser is turned on (S460). The DVD laser is used to detect the FE value and the number of s-curves (S470) and it is determined whether there are no s-curves of a CD or a DVD (S480). In case there are no s-curves or in case no s-curves are found, the disk is determined unsupported (S500) and the processing is terminated. In case an s-curve is found, the desk is determined as a DVD (S490) and the substrate thickness discrimination processing is terminated (S510).

Figure 8:
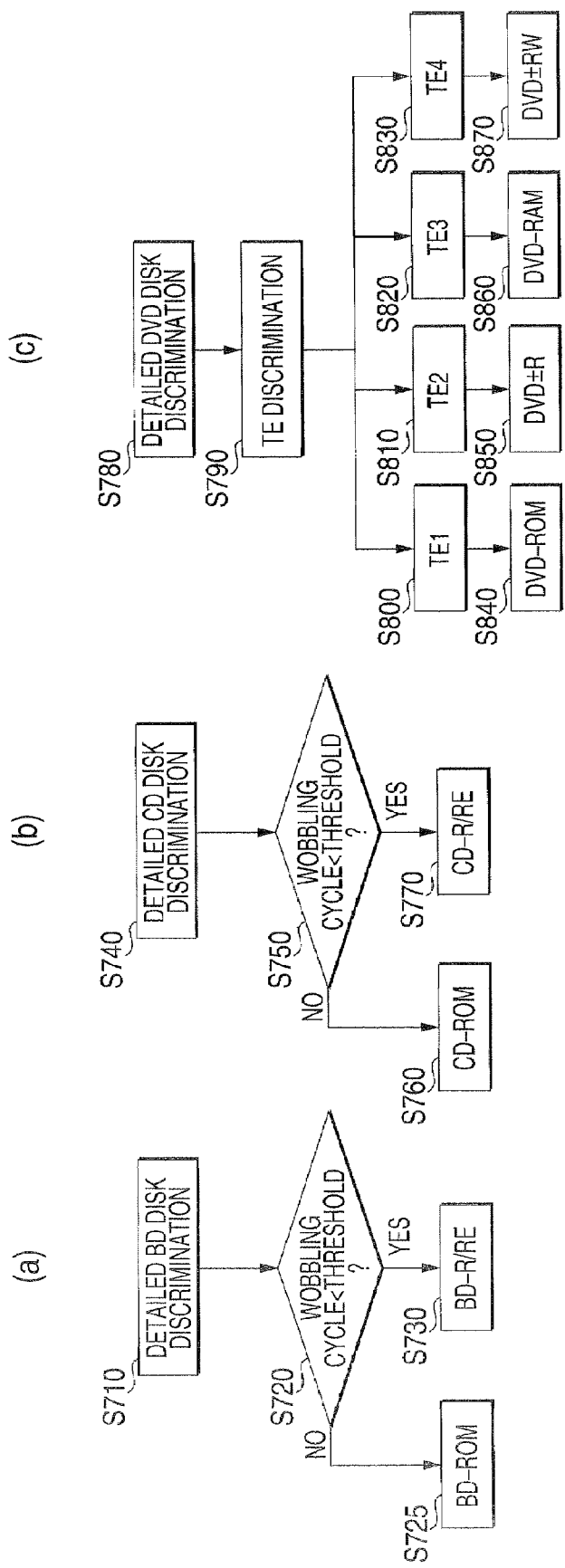
FIG. 8 is a flowchart of an example of detailed discrimination of an optical disk according to an embodiment of the invention.
Figure 9:
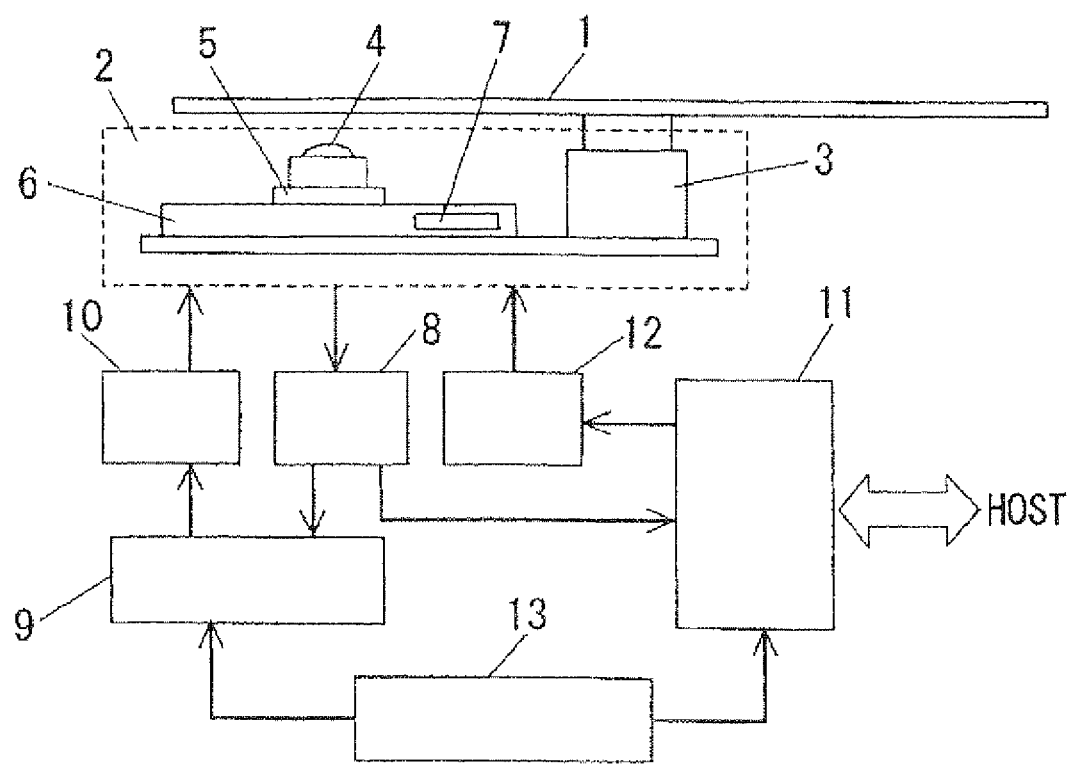
FIG. 9 is a block diagram of the pickup controller of an optical disk device.
Figure 10:
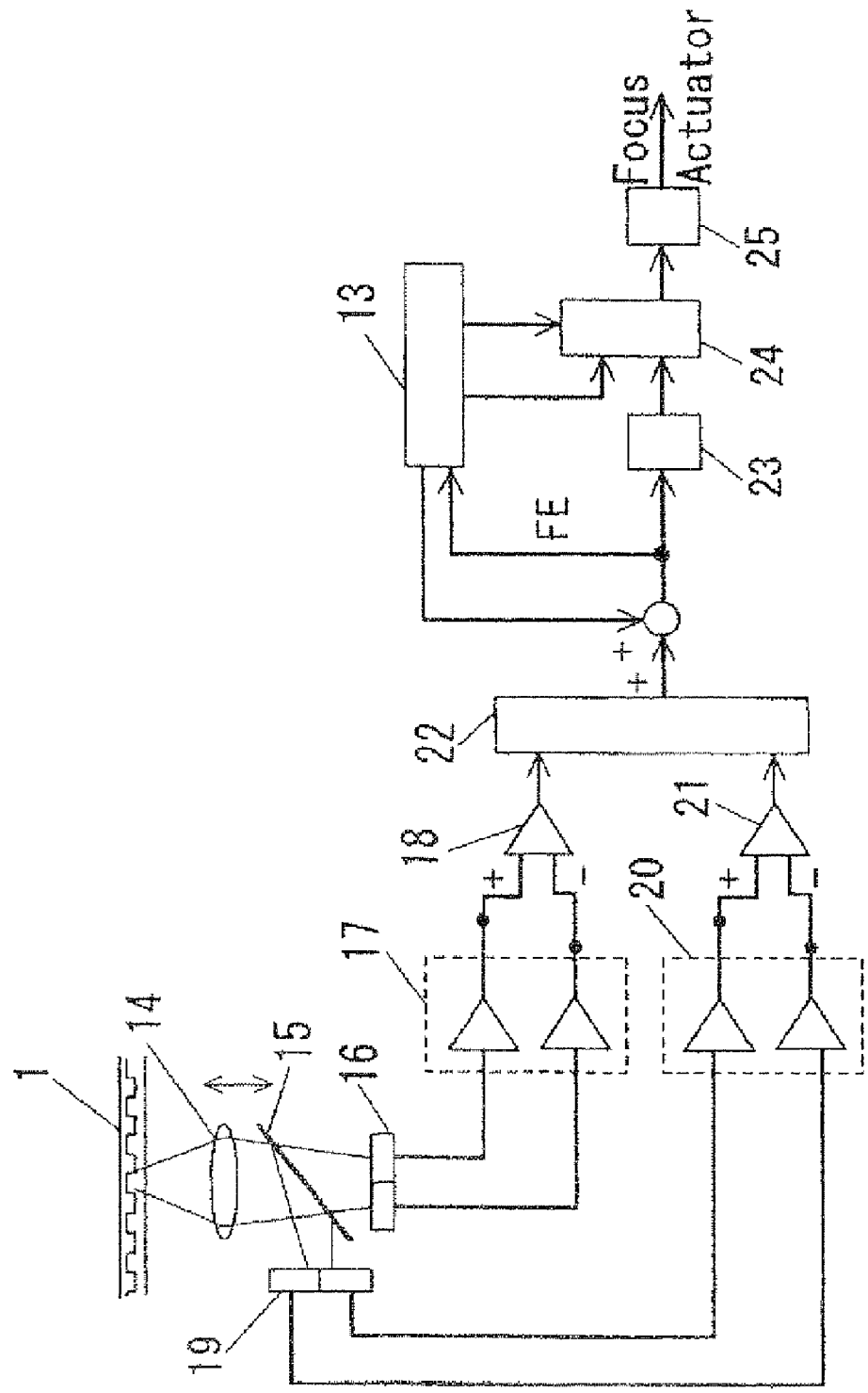
FIG. 10 is a block diagram of the focus control system of a related art optical disk device.
Figure 11:
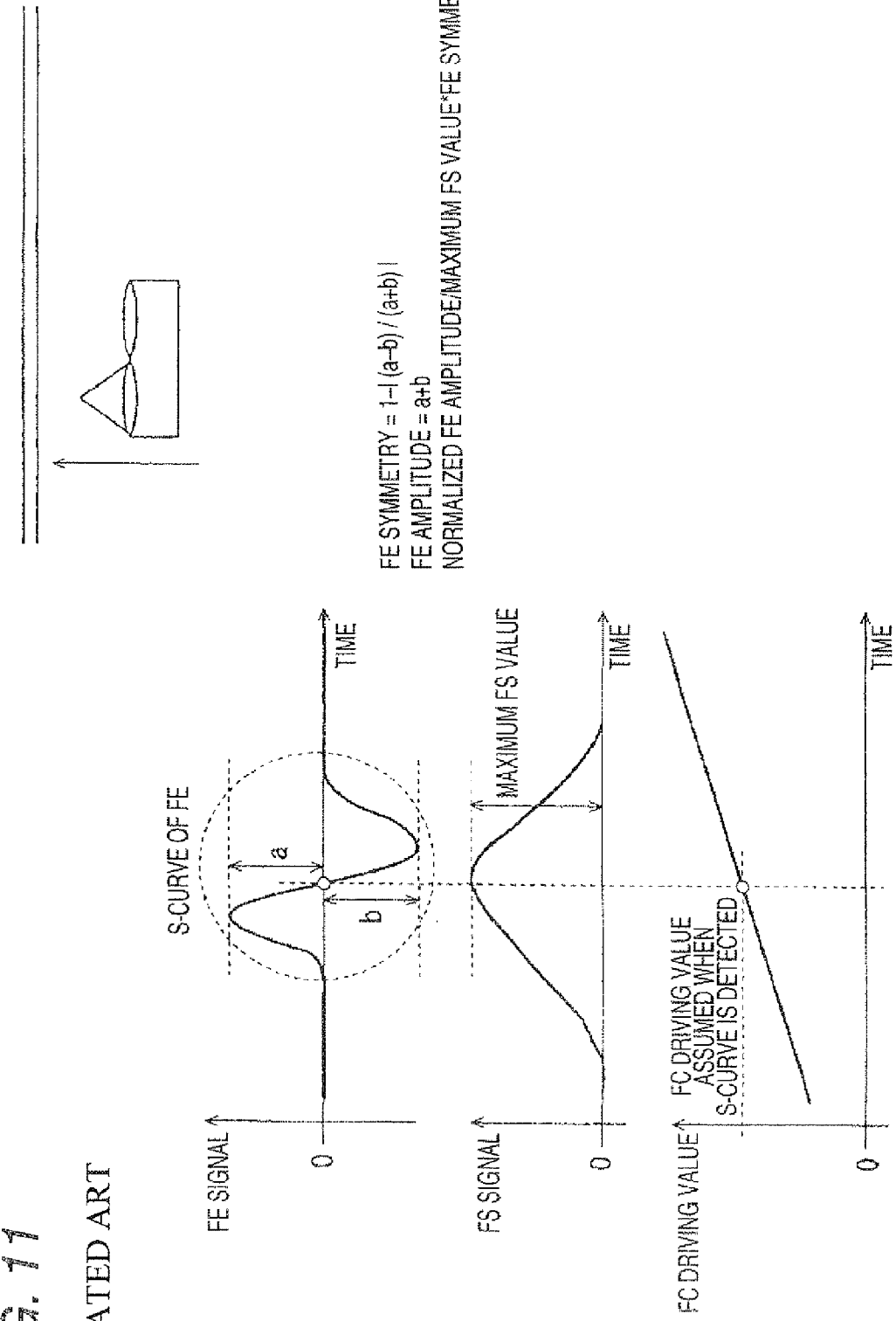
FIG. 11 is an explanatory drawing to discriminate the type of an optical disk.
Figure 12:
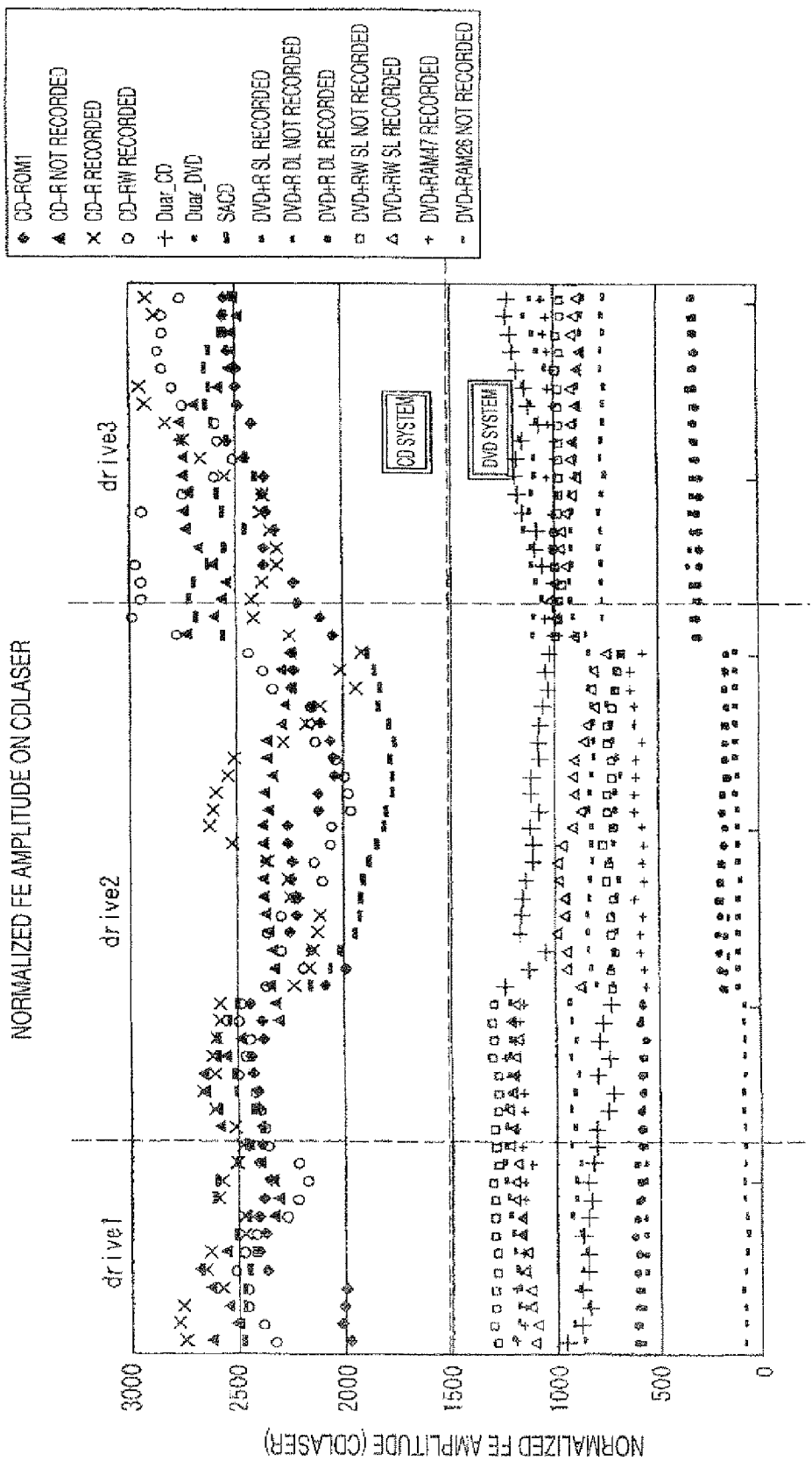
FIG. 12 shows normalized FE amplitude values by optical disk type and optical disk.
Figure 13:
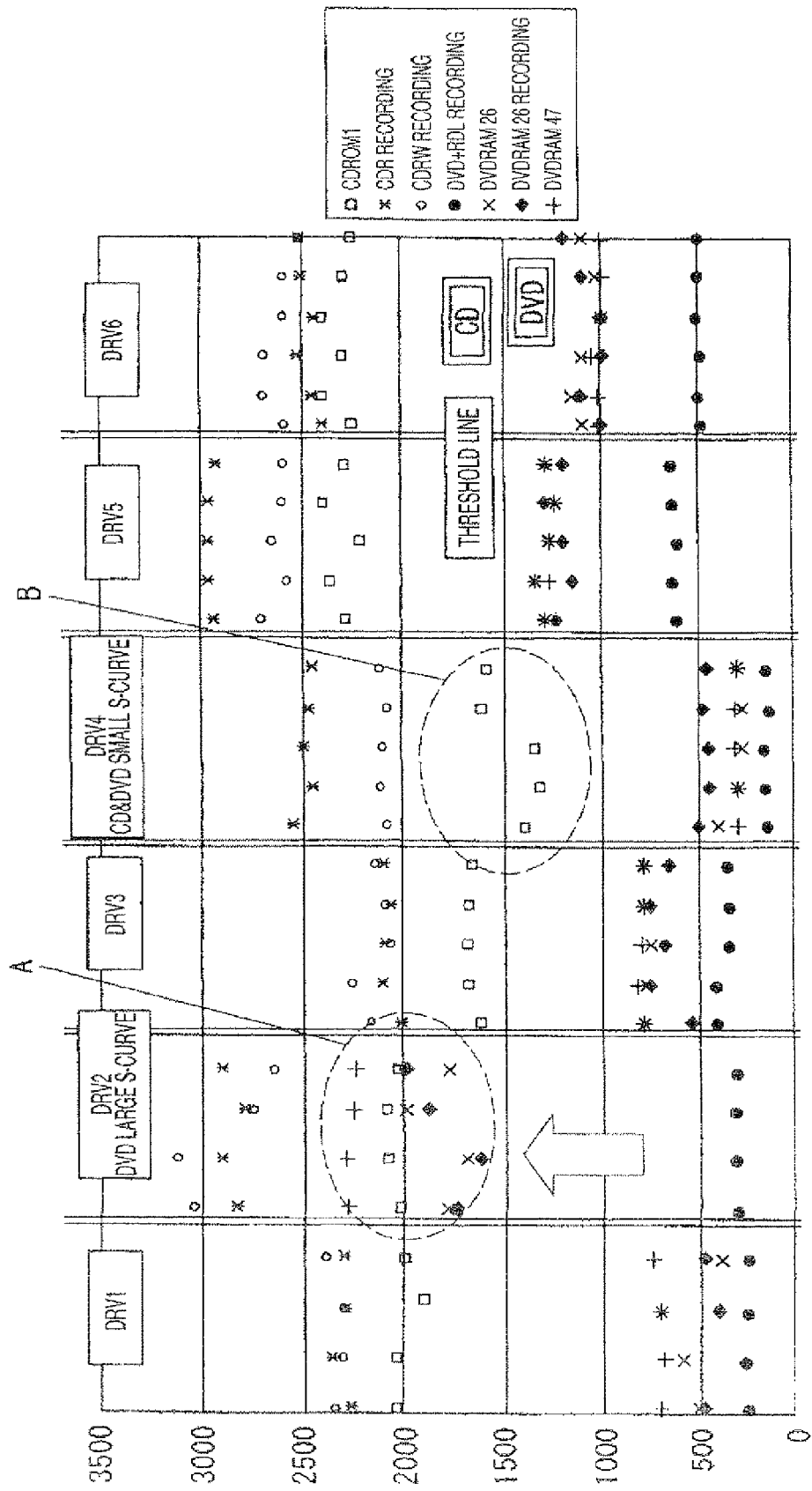
FIG. 13 represents normalized FE amplitude values corresponding to several types of optical disks.

FIG. 8 is a flowchart of an example of detailed discrimination of an optical disk according to an embodiment of the invention. FIG. 8(a) shows discrimination of an optical BD disk. When the detailed BD disk discrimination starts (S710), it is determined whether the wobbling cycle is smaller than a threshold (S720). In case the wobbling cycle is smaller than the threshold, the disk is determined as a BD-R/RE (S730). Otherwise, the disk is determined as a BD-ROM (S725).

FIG. 8(b) shows discrimination of an optical CD disk. When the detailed CD disk discrimination starts (S740), it is determined whether the wobbling cycle is smaller than a threshold (S750). In case the wobbling cycle is smaller than the threshold, the disk is determined as a CD-R/RW (S770). Otherwise, the disk is determined as a CD-ROM (S760).

FIG. 8(c) shows discrimination of an optical DVD disk. When the detailed DVD disk discrimination starts (S780), the disk is discriminated based on a tracking error (TE value) (S790). In case the discrimination result is TE1 based on the level of the TE level (S800), the disk is determined as a DVD-ROM (S840). In case the discrimination result is TE2 (S810), the disk is determined as a DVD±R (S850). In case the discrimination result is TE3 (S820), the disk is determined as a DVD-RAM (S860). In case the discrimination result is TE4, the disk is determined as a DVD±RW (S870).

This application is based upon and claims the benefit of priority of Japanese Patent Application No 2006-121476 filed on Jun. 26, 04, the contents of which are incorporated herein by reference in its entirety.

What is claimed is:

1. An optical disk device, comprising:
a laser unit including a first objective lens and a second objective lens, a numerical aperture of the first objective lens being different from a numerical aperture of the second objective lens;
a first focus driver for detecting a first voltage value indicating the value of a driving voltage to drive the first objective lens when light beams are irradiated onto a surface of an optical disk via the first objective lens and a focus is achieved;
a second focus driver for detecting a second voltage value indicating the value of a driving voltage to drive the second objective lens when light beams are irradiated onto the recording surface of said optical disk via the second objective lens and a focus is achieved; and
a controller for discriminating the type of the optical disk, based on a difference between the first voltage value and the second voltage value, wherein:
said controller discriminates the type of said optical disk as a DVD disk in case said difference is greater than a predetermined value and discriminates the type of said optical disk as a CD disk in case said difference is equal to or smaller than said predetermined value.

2. The optical disk device according to claim 1, wherein the first objective lens has a greater numerical aperture than the second objective lens.

3. The optical disk device according to claim 2, wherein said first objective lens is an objective lens for a Blu-ray (BD) laser.

4. The optical disk device according to claim 2, wherein said second objective lens is one for a DVD laser or a CD laser.

5. The optical disk device according to claim 2, wherein light beams used by said second focus driver are light beams for CDs.

6. The optical disk device according to claim 5, further comprising:
a storage for storing a predetermined adjustment value,
wherein said controller normalizes the difference between said first voltage value and said second voltage value by using said adjustment value and discriminates the type of said optical disk as a DVD disk in case said normalized difference is greater than a predetermined value and discriminates the type of said optical disk as a CD disk in case said normalized difference is equal to or smaller than said predetermined value.

7. The optical disk device according to claim 6, further comprising:
a third focus driver for detecting a third voltage value obtained when light beams for DVDs are irradiated onto the recording surface of said optical disk via said second objective lens and a focus is achieved,
wherein said predetermined adjustment value is the difference between said first voltage value and said third voltage value.

8. A method for discriminating a type of an optical disk in an optical disk device, the optical disk device having a laser unit, the laser unit including a first objective lens and a second objective lens, a numerical aperture of the first objective lens being different from a numerical aperture of the second objective lens, the method comprising:
detecting a first voltage value indicating the value of a driving voltage to drive the first objective lens when light beams are irradiated onto a surface of an optical disk via the first objective lens and a focus is achieved;
detecting a second voltage value indicating the value of a driving voltage to drive the second objective lens when light beams are irradiated onto the recording surface of said optical disk via the second objective lens and a focus is achieved;

calculating a normalized difference between the first voltage value and the second voltage value using an adjustment value; and discriminating the type of the optical disk as a DVD when the normalized difference is greater than a predetermined value and discriminating the type of the optical disk as a CD when the normalized difference is equal to or smaller than the predetermined value.

9. A method for discriminating a type of an optical disk in an optical disk device, the optical disk device having a laser unit, the laser unit including a first objective lens and a second objective lens, a numerical aperture of the first objective lens being different from a numerical aperture of the second objective lens, the optical disk device having a memory, the memory storing a predetermined adjustment value, the method comprising:

detecting a first voltage value indicating the value of a driving voltage to drive the first objective lens when light beams are irradiated onto a surface of an optical disk via the first objective lens and a focus is achieved;

detecting a second voltage value indicating the value of a driving voltage to drive the second objective lens when light beams are irradiated onto the recording surface of said optical disk via the second objective lens and a focus is achieved;

performing arithmetic operation of a difference between the first voltage value and the second voltage value;

normalizing the difference between the first voltage value and the second voltage value by using the predetermined adjustment value stored in the memory; and discriminating the type of the optical disk as a DVD when the normalized difference is greater than a predetermined value and discriminating the type of the optical disk as a CD when the normalized difference is equal to or smaller than the predetermined value.

10. An optical disk discriminating method comprising:

detecting a first voltage value indicating the value of a driving voltage to drive a first objective lens when light beams are irradiated onto a surface of an optical disk via the first objective lens and a focus is achieved;

detecting a second voltage value indicating the value of a driving voltage to drive a second objective lens when light beams are irradiated onto the recording surface of said optical disk via the second objective lens and a focus is achieved;

calculating a difference between the first voltage value and the second voltage value; and discriminating the type of the optical disk as a DVD in case said difference is greater than a predetermined value and discriminating the type of the optical disk as a CD in case said difference is equal to or smaller than the predetermined value.

11. An optical disk device comprising:

a first output part for outputting a first voltage, the first voltage being a driving voltage when a surface of an optical disk is irradiated by driving a first objective lens and a focus is achieved;

a second output part for outputting a second voltage, the second voltage being a driving voltage when the surface of the optical disk is irradiated by driving a second objective lens and a focus is achieved; and a controller for calculating a difference between the first voltage value and the second voltage value, discriminating the type of said optical disk as a DVD disk in case said difference is greater than a predetermined value, and discriminating the type of said optical disk as a CD in case said difference is equal to or smaller than said predetermined value.

12. An optical disk discriminating method comprising:

outputting a first voltage, the first voltage being a driving voltage when a surface of an optical disk is irradiated by driving a first objective lens and a focus is achieved;

outputting a second voltage, the second voltage being a driving voltage when the surface of the optical disk is irradiated by driving a second objective lens and a focus is achieved; and calculating a difference between the first voltage value and the second voltage value, discriminating the type of said optical disk as a DVD disk in case said difference is greater than a predetermined value, and discriminating the type of said optical disk as a CD in case said difference is equal to or smaller than said predetermined value.

* * * * *